(12) United States Patent
Backhaus-Ricoult et al.

(10) Patent No.: US 8,148,297 B2
(45) Date of Patent: Apr. 3, 2012

(54) RETICULAR CORDIERITE COMPOSITION, ARTICLE AND MANUFACTURE THEREOF

(75) Inventors: Monika Backhaus-Ricoult, Horseheads, NY (US); Christopher Raymond Glose, Painted Post, NY (US); James William Zimmermann, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/627,612

(22) Filed: Nov. 30, 2009

(65) Prior Publication Data

US 2011/0130276 A1 Jun. 2, 2011

(51) Int. Cl.
*B01J 23/00* (2006.01)
*B01J 21/00* (2006.01)
*B01J 20/00* (2006.01)

(52) U.S. Cl. ........ 502/410; 502/251; 502/263; 502/439; 502/527.19

(58) Field of Classification Search .................. 502/439, 502/527.19, 251, 263, 410
See application file for complete search history.

(56) References Cited

U.S. PATENT DOCUMENTS

| | | | |
|---|---|---|---|
| 5,866,244 A | 2/1999 | Jessen | |
| 6,284,693 B1 * | 9/2001 | Beall et al. | 501/119 |
| 6,300,263 B1 * | 10/2001 | Merkel | 501/9 |
| 6,391,813 B1 * | 5/2002 | Merkel | 501/119 |
| 6,432,856 B1 * | 8/2002 | Beall et al. | 501/118 |
| 6,773,657 B2 * | 8/2004 | Beall et al. | 264/628 |
| 7,141,089 B2 * | 11/2006 | Beall et al. | 55/523 |
| 7,179,316 B2 * | 2/2007 | Merkel et al. | 55/523 |
| 7,294,164 B2 * | 11/2007 | Merkel | 55/523 |
| 7,309,371 B2 * | 12/2007 | Merkel et al. | 55/523 |
| 7,364,689 B2 | 4/2008 | Noguchi et al. | |
| 7,445,745 B2 | 11/2008 | Peterson | |
| 7,520,911 B2 * | 4/2009 | Beall et al. | 55/523 |
| 7,572,311 B2 | 8/2009 | Zuberi | |
| 7,618,699 B2 * | 11/2009 | Beall et al. | 428/116 |
| 7,648,550 B2 * | 1/2010 | Beall et al. | 55/523 |
| 7,704,296 B2 * | 4/2010 | Merkel | 55/523 |
| 7,744,980 B2 * | 6/2010 | Boorom et al. | 428/116 |
| 2002/0010073 A1 * | 1/2002 | Beall et al. | 501/128 |
| 2006/0021308 A1 * | 2/2006 | Merkel | 55/523 |
| 2007/0214759 A1 * | 9/2007 | Merkel | 55/523 |
| 2007/0281127 A1 | 12/2007 | Backhaus-Ricoult et al. | 428/116 |
| 2008/0004171 A1 * | 1/2008 | Melscoet-Chauvel et al. | 501/119 |
| 2008/0032091 A1 * | 2/2008 | Beall et al. | 428/116 |
| 2008/0057267 A1 * | 3/2008 | Brocheton et al. | 428/116 |
| 2009/0137382 A1 * | 5/2009 | Merkel | 502/60 |
| 2009/0220734 A1 | 9/2009 | Backhaus-Ricoult et al. | 428/116 |
| 2009/0220736 A1 * | 9/2009 | Merkel | 428/116 |

(Continued)

FOREIGN PATENT DOCUMENTS

EP 1 752 631 2/2007

(Continued)

*Primary Examiner* — Cam N. Nguyen
(74) *Attorney, Agent, or Firm* — Joseph M. Homa; Matthew J. Mason

(57) ABSTRACT

A porous ceramic material is disclosed having a principal cordierite phase, the porous ceramic material exhibiting a normalized strength greater than 20 MPa. The cordierite phase has a reticular microstructure. A method for forming a porous ceramic body having a predominant phase of cordierite is provided which includes forming a body from a plasticized mixture of inorganic ceramic-forming ingredients that include a magnesia source, a silica source, and an alumina source, the alumina source including alumina-containing elongated particles, wherein at least 90 wt % of the alumina-containing elongated particles have a length of 50 to 150 µm, and then firing the body.

15 Claims, 9 Drawing Sheets

U.S. PATENT DOCUMENTS

2010/0126132 A1* 5/2010 Merkel .................. 55/523

FOREIGN PATENT DOCUMENTS

| | | |
|---|---|---|
| EP | 1852406 | 8/2008 |
| JP | 02-080379 | 3/1990 |
| JP | 06-056551 | 3/1994 |
| JP | 07-206540 | 8/1995 |
| JP | 08-337479 | 12/1996 |
| JP | 09-263465 | 10/1997 |
| WO | 98/28241 | 7/1998 |
| WO | 2008/005291 | 1/2008 |
| WO | 2008/027270 | 3/2008 |
| WO | 2008096413 | 8/2008 |
| WO | 2008/144291 | 11/2008 |
| WO | 2008/147684 | 12/2008 |

* cited by examiner

A    B    C

A    B    C

A B C

RETICULAR CORDIERITE COMPOSITION, ARTICLE AND MANUFACTURE THEREOF

FIELD

This disclosure relates to porous cordierite material and porous cordierite articles having reticular microstructure, and methods of manufacture of the articles, and in particular extruded shaped articles, such as honeycomb shaped articles, that can be used, for example, as a catalyst support substrate or filter.

BACKGROUND

Cordierite has been used for a variety of applications such as catalytic substrates and filters for diesel particulate emission. Cordierite has low thermal expansion and is therefore suited for applications where high thermal shock resistance is required. Cordierite shows anisotropy in its thermal expansion with the different crystallographic directions exhibiting positive and negative expansion. Due to the anisotropy in thermal expansion, mismatch strains build up between grains with different crystallographic orientation, and such strains can lead to microcracking. Polycrystalline cordierite ceramics undergo extensive microcracking during thermal cycling. Microcracks open during cooling and heal during heating. This creates a hysteresis response in the thermal cycling behavior with differences between the heating and cooling curve that can be attributed to the presence of microcracks. As a result of the microcracking, the overall thermal expansion of the ceramics is lowered compared to the crystallographic average CTE.

In one sense, lowering the coefficient of thermal expansion (CTE) through microcracking is beneficial, as the thermal shock resistance of the material, which is proportional to the material's strength and inversely proportional to its elastic modulus and thermal expansion, is expected to improve with microcracking. However, the material strength is significantly lowered with growing microcrack density, so that balancing fracture toughness, porosity, thermal expansion and strength becomes difficult.

SUMMARY

In one aspect, a porous ceramic material is disclosed herein comprised of a principal cordierite phase, the porous ceramic material exhibiting a normalized strength, $(MOR)(relCFA)^{-1}(1-\text{porosity}/100)^{-1}$, greater than 20 MPa. The cordierite phase has a reticular microstructure.

In another aspect, a method for forming a porous ceramic body having a predominant phase of cordierite is disclosed herein, the method comprising forming: a plasticized mixture comprising inorganic ceramic-forming ingredients comprised of a magnesia source, a silica source, and an alumina source, the alumina source comprising alumina-containing elongated particles, wherein at least 90 wt % of the alumina-containing elongated particles have a length of 50 to 150 μm; extruding the plasticized mixture into a green body; and heating the green body to form the porous ceramic body.

The materials disclosed herein, and/or the methods disclosed herein, can be implemented to provide various exhaust gas after-treatment systems that have highly porous walls and allow gas flow through the walls (in some applications even with thick catalyst-bearing washcoat) without restricting engine power, provide high filtration efficiency for emitted particles, exhibit high strength, bear severe thermal shock during rapid heating and cooling, and withstand the corroding exhaust environment. Such materials and methods can be used to reach very low pressure component drop, for example through very thin (ultrathin) walls or through high porosity, and which can also offer a high soot mass limit.

DETAILED DESCRIPTION

The present disclosure provides a novel cordierite ceramic that has a reticular microstructure. Templated growth of cordierite from precursor elongated particles, such as precursor alumina or aluminosilicate elongated particles, imposes during reactive firing a preferential crystallographic alignment of the cordierite negative expansion direction in the extrusion direction and preferably produces small size domains. The material having reticular microstructure exhibits improved strength compared to comparative material having microstructure formed solely from particulate raw materials, even with same porosity.

Plasticized batches can contain an organic binder such as a cellulosic material. A list of exemplary and non-limiting organic binders suitable for providing an organic binder include cellulose ether binders and derivatives thereof, such as methylcellulose, ethylhydroxy ethylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof.

In a first set of embodiments, elongated particles containing alumina and 3 to 4% silica (type 1 elongated particles) were used as batch raw material, and in a second set of embodiments, aluminosilicate elongated particles (type 2 elongated particles) were used as batch raw material. As used herein, the length of an elongated particle refers to the length of a maximum dimension, and diameter of an elongated particle refers to the mean diameter in a transverse direction (perpendicular to) the maximum dimension.

Figure 1:
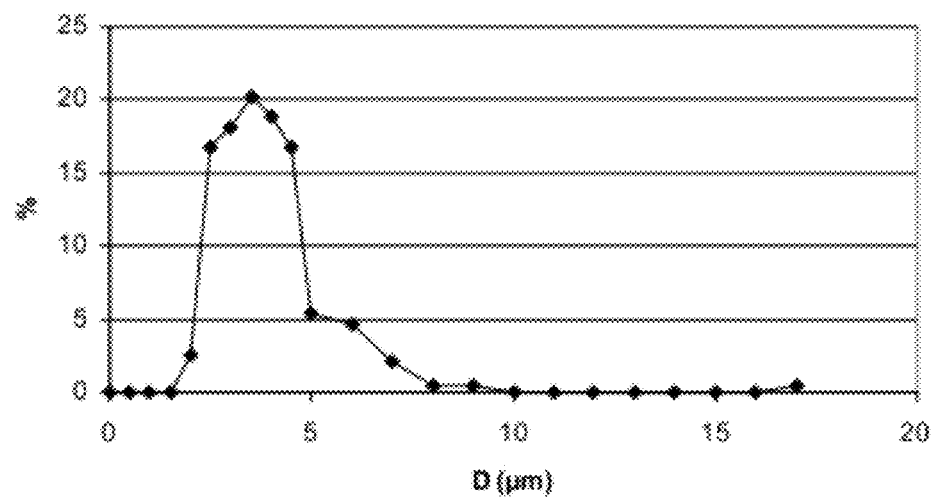
FIG. 1 shows a representative diameter distribution of type 1 (alumina-rich) material used in the extrusion batch.
Figure 2:
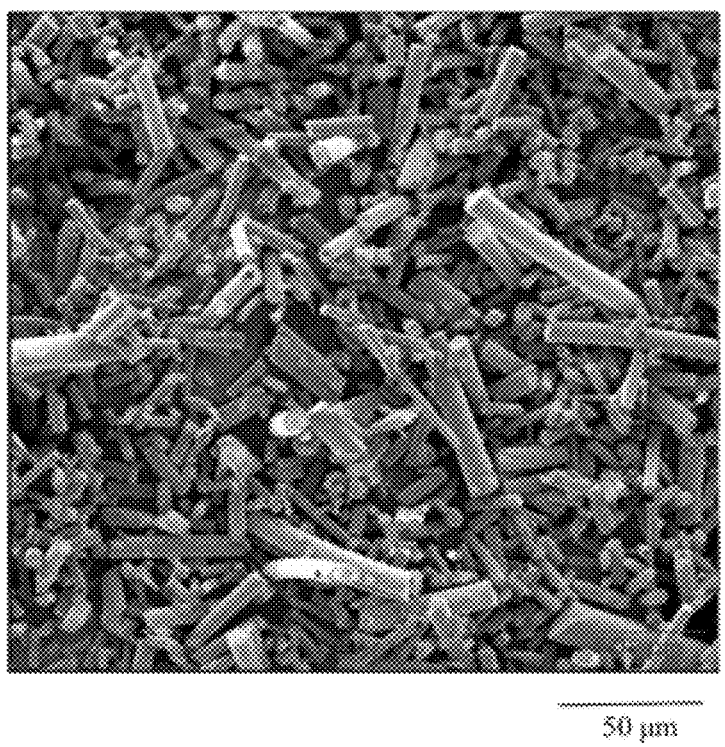
FIG. 2 shows an SEM micrograph of type 1 elongated alumina-rich material used for batching.

The median diameter of the type 1 elongated particles was about 3 μm, wherein 90% of elongated particle diameters were within 2 to 5 micrometers. The elongated particle length was 50-150 μm and the diameters of the elongated particles are shown in FIG. 1. FIG. 2 shows an SEM micrograph of type 1 elongated particles.

Figure 3:
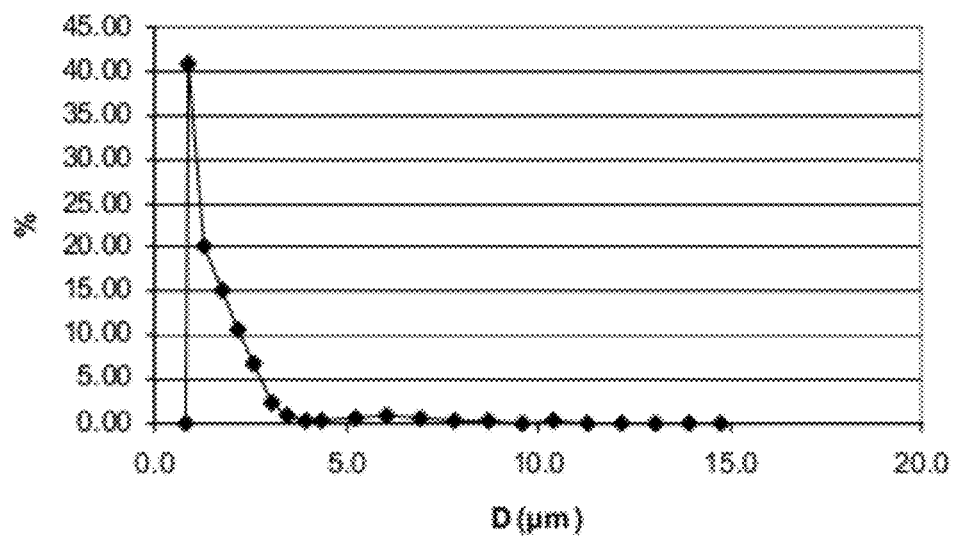
FIG. 3 shows a representative diameter distribution of type 2 (aluminosilicate) material used in the extrusion batch.
Figure 4:
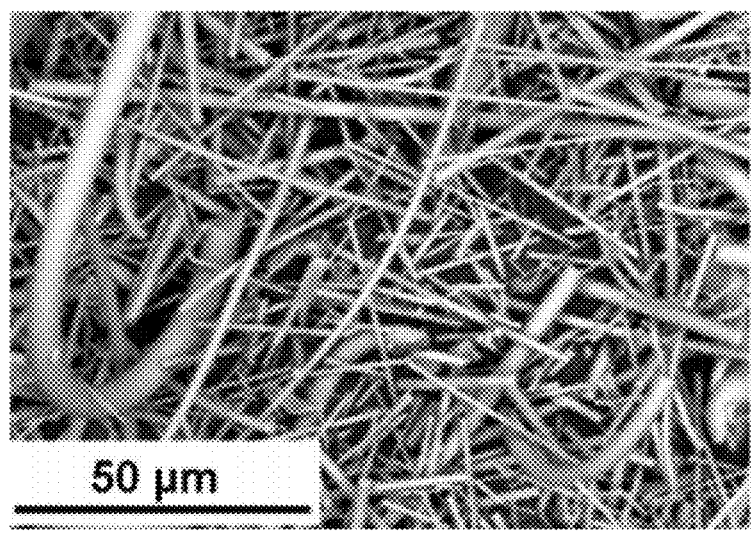
FIG. 4 shows an SEM micrograph of the elongated particles of type 2 used for incorporation in the extrusion batch.

The aluminosilicate particles were 50% alumina, 50% silica, and 90% of the elongated particles made from the aluminosilicate particles had diameters of 1 to 3 μm, and the elongated particles have the same diameters as shown in FIG. 3. FIG. 3 shows a distribution of diameters representative of the different types of aluminosilicate particles, FIG. 4 shows an SEM micrograph of the type 2 aluminosilicate elongated particles.

The alumina or aluminosilicate elongated particles were used as raw material in oxide, talc-based and clay-based cordierite batches. Alumina and silica-based raw materials were partially or fully substituted. Elongated particle levels in the batches ranged from 10 to 70% wt % relative to the inorganic raw materials contained in respective batch compositions Table 1 lists the various batch compositions, D1-D12. Amounts are listed in wt % relative to the inorganic raw materials contained in respective batch compositions. Batch Nos. D1, D3, and D12 were comparative batches containing no inorganic ingredients obtained from fiber raw materials. Batch compositions D2, D4, D5, and D10 utilized alumina type 1 elongated particles. Batch compositions D6, D7, D8, D9 and D11 utilized aluminosilicate type 2 elongated particles. Batch compositions D2, D8, D9, D10 and comparative D1 were oxide-only inorganic containing (i.e. oxide) batches (i.e. no clay, no talc). Batch compositions D4 and comparatives D3 and D12 were clay and talc containing (i.e. clay-talc containing) batches. Batch composition D7 was a no talc, clay-containing (i.e. clay, no talc) batch. Batch compositions D5, D6, and D11 were no clay, talc-containing (i.e. talc, no clay) batches. Potato starch (PS) was included in Batch compositions D1 to D4 and D11 as a pore former, and corn starch (CS) was included in Batch compositions D5 to D10 and D12 as a pore former. The pore formers are reported in Table 1 in wt % super-addition to the other inorganic materials listed in Table 1 for each respective batch composition. Batch compositions D2, D3 and D12 contained "A5" alumina having a median particle size of 5 micrometers, wherein the alumina was not present in the form of elongated particles as defined herein. Batch compositions D6 and D11 contained "A3" alumina having a median particle size of 3 micrometers, wherein the A3 alumina was not present in the form of elongated particles as defined herein. Batch compositions D3, D4, and D12 contained aluminum hydroxide (Al(OH)$_3$) which was not present in the form of elongated particles as defined herein.

TABLE 1

| Batch Comp. No. | Elongated Particle Type | % Elong. Particle | % SiO$_2$ | % MgO | alumina type | % alumina | Talc | Kaolin | % Al(OH)$_3$ | % Pore former super-addition | Pore former |
| --- | --- | --- | --- | --- | --- | --- | --- | --- | --- | --- | --- |
| D1 | — | 0.00 | 51.00 | 14.00 | | 35.00 | | | | 10.00 | PS |
| D2 | 1 | 10.00 | 50.70 | 14.00 | A5 | 25.30 | | | | 10.00 | PS |
| D3 | — | 0.00 | 12.50 | | A5 | 14.80 | 40.70 | 16.00 | 16.00 | 10.00 | PS |
| D4 | 1 | 15.30 | 12.00 | | | | 40.70 | 16.00 | 16.00 | 10.00 | PS |
| D5 | 1 | 34.60 | 21.03 | | | | 44.00 | | | 15.00 | CS |
| D6 | 2 | 44.86 | | | A3 | 11.14 | 44.00 | | | 15.00 | CS |
| D7 | 2 | 40.00 | 13.00 | 13.00 | | | | 37.00 | | 15.00 | CS |
| D8 | 2 | 70.00 | 16.41 | 13.76 | | | | | | 15.00 | CS |
| D9 | 2 | 50.00 | 26.38 | 13.76 | | | | | | 15.00 | CS |
| D10 | 1 | 36.00 | 50.23 | 13.76 | | | | | | 15.00 | CS |
| D11 | 2 | 44.86 | | | A3 | 11.14 | 44.00 | | | 15.00 | PS |
| D12 | — | 0.00 | 14.75 | | A5 | 14.98 | 40.73 | 15.95 | 16.12 | 15.00 | CS |

Honeycomb porous ceramic article were made by ram extrusion. The ceramic articles comprised a principal cordierite phase, and can be referred to as being made of a cordierite-based material. A 1" ram extruder was used. The dry fiber blanket was milled for 2 minutes into a fluent mix of short segments of 50-150 micrometers in length. In a first step of mixing, the inorganic non-fibrous raw materials, pore former and binder were pre-mixed. Dry ingredients were combined in a pan and mulled. In a second mixing step, the broken fiber segments were fed to a running muller. The powder mixture was then dry mixed for about 2-5 minutes until a smooth flowing dry mix was obtained. In a third mixing step, the batch water was added (and water was not added before the third step). For ram extrusions the water call was 28%-30% based on inorganic batch material. In most cases two 10 mesh crossed screens were used before the homogenizer (disposed upstream of the extruder die) and a 1 inch mask that had a 0.006" skin former region. A 200 cpsi/16 mil die was used (cpsi=cells per square inch; mil=thousandth of an inch). Extrusion was seamless at high extrusion speeds, while lower speeds caused skin tears and lost cells.

The 1" extruded samples were then dried in a commercial 1000 W Whirlpool microwave dryer. The drying schedule was 1000 Watts for 3 minutes, followed by drying in air at 90° C. for 12 hrs.

All samples were heated to top temperatures between 1410 and 1435° C. using a ramp rate of 120° C./hr and held at top temperature for 15 to 30 hours and cooled at a rate of −120 C/hr to 25 C in a box furnace with air.

The phases present in the fired parts were identified by X-ray diffraction (XRD). A Bruker D4 diffraction system equipped with a multiple strip LynxEye high speed detector was utilized. High resolution spectra were typically acquired from 15 to 100° (2θ). Rietveld refinement was used for quantification of the phase contributions.

Standard scanning electron microscopy, SEM, characterization was conducted on honeycomb wall surfaces and polished honeycomb wall long cross sections (cut in the direction of the honeycomb channels, i.e. the extrusion direction) and polished honeycomb cross sections (cut perpendicular to the honeycomb channels). For the observation of polished sections, the fired ware was infiltrated with epoxy, sliced and polished. The spatial distribution of porosity and phases in presence at a microscopic level was visualized on polished sample cross sections. High resolution SEM was used to derive details of the reticular microstructure and the phase distribution. Chemical composition of the different phases and elemental distributions were obtained from (qualitative) analysis and elemental mapping by energy dispersive X-ray spectroscopy on the SEM.

Electron backscattered diffraction on the SEM was used for orientation mapping of polished sample sections to derive grain size, relative orientation and texture of the phases in presence with respect to the honeycomb geometry. The technique uses the focused incident electron beam in an SEM to gain local crystallographic information with high spatial resolution. The EBSD detector consists of a phosphor screen inserted in the specimen chamber. As the incident electrons strike the specimens, many are elastically scattered in all directions within the sample. Therefore if the material at the point of impact is crystalline, there will be energetic electrons with the proper trajectories to obey Bragg's Law ($n\lambda=2d \sin \theta$) and, consequently, two opposing cones of diffracted electron will emanate from each lattice plane. The intersection of these cones of diffraction on the phosphor screen create two intense lines, known as Kikuchi lines, defining a band with a thickness proportional to the "d" spacing of the appropriate crystallographic plane. Consequently, an Electron Backscatter Diffraction Pattern (EBSD) consisting of numerous intersecting Kikuchi lines is formed and by knowledge of the geometric relationship between the sample surface and the EBSD detector, the crystallographic orientation can be precisely determined. Because the incident electron beam of the SEM can be scanned across the sample, quantitative crystallographic orientation mapping with excellent spatial resolution can be obtained. Kikuchi patterns vary strongly with lattice spacing and lattice symmetry; thus they can be used to distinguish (without further chemical analysis) different phases present in a material, differences in lattice parameter due to chemical composition change or differences in lattice strain.

The samples were embedded in epoxy with the use of vacuum, then cured at 100° C. overnight. Samples were then polished parallel to the web surface (transverse orientation or long section) and perpendicular to the extrusion direction (axial orientation or cross section) with care as the backscatter electrons are collected from the near surface region of the polished sample surface. The final polish was completed with 0.05 µm colloidal silica on a Red Final C pad. Following polishing, a thin (10 Å) layer of iridium coating was applied to create a conductive surface and avoid charging problems during the long EBSD data collection.

All EBSD analysis was completed on a Hitachi SU70 SEM, equipped with an Oxford/HKL EBSD system. Data collection was completed under the following conditions: 23 nA beam current, 20 kV accelerating potential, 2 µm step size for overall orientation information and 0.2 µm step size for grain size determination. Cross-section areas were collected from one intersection to an adjacent intersection, approximately 1900 µm×700 µm. Long-section areas were collected on 16 adjacent regions (4×4) resulting in a total image size of 1000 µm×700 µm. Phases used for identification of fully fired cordierite materials included cordierite, mullite, spinel etc.

Post-collection analysis of the EBSD data included stitching of the 16 regions collected utilizing the HKL Map Stitcher and noise reduction by removing wild spikes and smoothing. Pole figures were generated using HKL Mambo software with 5° data clustering. Density scales for the pole figures were adjusted so that the minimum corresponds to the minimum experimental density of the c-axis orientation and the maximum to the maximum experimental density of the c-axis orientation. The maximum of the scale is close to 1 for low texturing and reaches high values for strong alignment. In various samples measured, we found a crystalline texturing factor of the negative expansion c-axis in the direction of extrusion (extrusion axis direction) having a value of 3.

Pore size distributions were explored by mercury intrusion porosimetry using an Autopore IV 9500 porosimeter. This method uses the capillary law with non-wetting liquid and cylindrical pores. It is typically expressed with the Washburn equation $D=-(1/P) 4y \cos \emptyset$, where D is the pore diameter, P the applied pressure, y the surface tension and $\emptyset$ the contact angle. The volume of mercury is directly proportional to the pressure.

Micromeritics software data reduction uses the differential and log differential to calculate the first derivative of the cumulative specific intrusion volume as a function of calculated log diameter.

Mercury porosimetry can be used to calculate the permeability. Permeability is the relationship of fluid flow rate and applied pressure. In the Autopore pressure is increased and the mercury fills smaller and smaller pores until a critical pressure is reached where the mercury spans the sample. It is typically expressed with the equation $k=\frac{1}{226}(L_c)^2 \sigma/\sigma_o$ where $\sigma$ is the conductivity at length $L_c$ and $\sigma_o$ is the conductance in the pore and reported in millidarcys.

Thermal expansion was measured for bar-shaped samples with dimension 0.25"×0.25"×2" during heating from room temperature to 1200° C. at a rate of 4 C/min and subsequent cooling to room temperature. For the data reported in the property table, the long axis of the test bars was oriented in the direction of the honeycomb channels, thus providing the thermal expansion in the axial direction of the honeycomb parts.

Average thermal expansion coefficients for various temperature ranges are recorded in the property table, $CTE^{20-800}$ in $K^{-1}$, the average thermal expansion coefficient from room temperature to 800° C., defined as L(800° C.)–L(20° C.)/780° C. as average thermal expansion coefficient in the temperature range from room temperature to 800° C., $CTE^{20-1000}$ in $K^{-1}$, the average thermal expansion coefficient from room temperature to 1000° C., defined as L(1000° C.)–L(20° C.)/980° C. as average thermal expansion coefficient in the temperature range from room temperature to 1000° C., $CTE^{500-900}$ in $K^{-1}$, the average thermal expansion coefficient from 500 to 900° C., defined as L(900 C)–L(500 C)/400 C as average thermal expansion coefficient in the temperature range from 500° C. to 800° C. $CTE^{500-900}$ is of particular importance for the application of honeycomb parts for exhaust after treatments in the automotive vehicle, where the honeycomb part is subjected to severe rapid temperature changes and where the temperature range from 500-900° C. would match a frequently encountered operation temperature range.

The strength of a ceramic material can be tested using three or four bending. The maximum stress prior to failure is often referred to as the modulus of rupture or MOR. As used herein MOR refers to a test measurement obtained from a four-point flexure modulus of rupture test according to ASTM C1674-08 of a honeycomb sample having a cell density (CD) in units of cells per square units of length measure (e.g. cells per square inch, or cpsi) and a honeycomb matrix cell wall thickness, $T_{WALL}$, in units of the length measure (e.g. inches). We used Test Method A of ASTM C1674-08. Strength values (4-point flex. MOR) have been measured herein using four point flexure with a lower span of 2" (50.8 mm) and an upper span of 0.75" (19 mm) The specimen geometry for the 4-point flexure tests was 2.5" (63.5 mm) in length, 0.5" (12.7 mm) in width and 0.25" (6.4 mm) thick. The force-measuring system used was equipped with a read-out of the maximum force and a calibrated load cell. All specimens tested had a square cellular (honeycomb) with the channels in the direction of the length. The actual material strength, often referred to as the wall strength ($\sigma_{wall}$), has to be determined by accounting for the cellular structure. Another measure of material strength is "normalized strength", which takes into account the porosity of the material as well as the geometry of the MOR test sample, wherein normalized strength is herein defined as: $(MOR)(relCFA)^{-1}(1-porosity/100)^{-1}$, wherein relCFA is the relative closed frontal area defined herein as: $relCFA = T_{WALL}[2 L - T_{WALL}]/L^2$, wherein $L = CD^{-1/2}$, and wherein porosity is the total porosity, in %, as measured by mercury intrusion porosimetry. The cell density (CD) is in units of cells per square units of length measure (e.g. cells per square inch, or cpsi) and the honeycomb matrix cell wall thickness $T_{WALL}$ is in corresponding units of the length measure (e.g. inches).

Bar-shaped samples with dimension 5"×1"×0.5" and the long axis being oriented in the direction of the honeycomb channels were used to measure the elastic modulus by flexural resonance frequency. Samples were heated to 1200° C. and cooled back to room temperature. For each temperature the elastic modulus was directly derived from the resonance frequency and normalized for sample geometry and weight by referring to ASTM C 1198-01.

Figure 5:
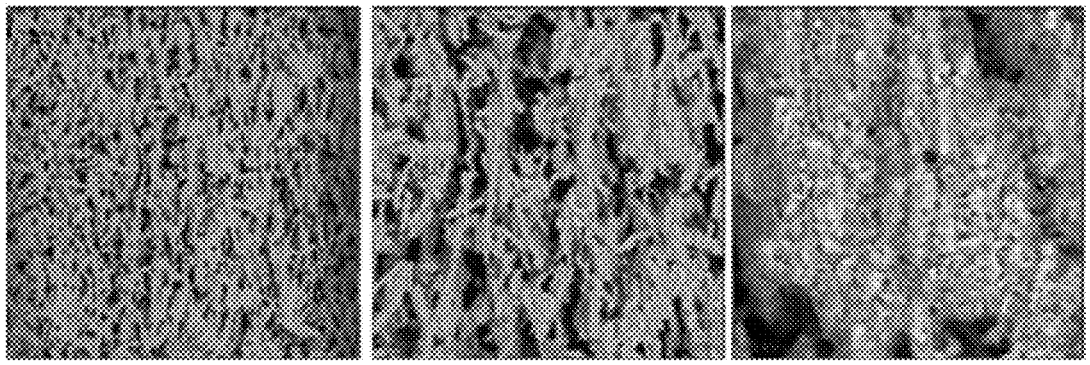
FIG. 5 shows SEM views of a fired wall surface of an embodiment (Sample 14) made from an oxide batch with 36% alumina-rich elongated particles (Batch composition D10) after firing to 1430° C.
Figure 6:
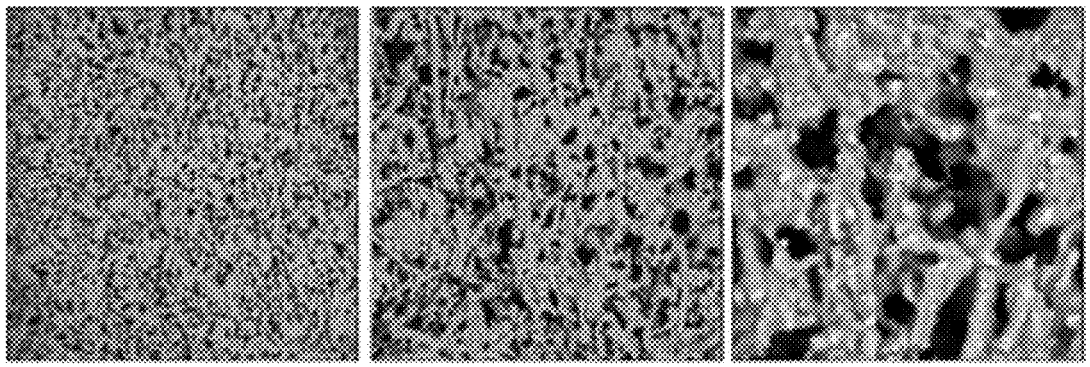
FIG. 6 shows a SEM micrograph of a fired wall surface of an embodiment (Sample 13) made from an oxide batch with 50% aluminosilicate elongated particles (Batch composition D9) after firing to 1430° C.

The use of type 1 or type 2 elongated particles in the cordierite batch yielded porous, low expansion cordierite ceramics with a reticular microstructure, which we found yielded improved properties compared to comparative ceramics made with particulate-only inorganic raw materials (no type 1 or type 2 elongated particles). In the reticular microstructure, grains of the ceramic products are organized into polycrystalline strands and surround elongated pores. FIGS. 5-6 show representative SEM images of the reticular microstructure of the cordierite materials made herein from alumina or aluminosilicate elongated particles as batch raw materials. The low magnification image illustrates the reticular microstructure of the high porosity ceramic; the higher magnification SEM image reveals the polycrystalline nature of the strands that form by solid state reaction during firing from the raw material elongated particle template and the particulate raw materials.

Reticular cordierite microstructure was obtained with alumina, aluminosilicate and silica elongated particles and with different elongated particle amounts in the batch. Reticular microstructures can span a wide range of networks which differentiate in the width of their polycrystalline strands, their interconnectivity, open pore size and shape. The microstructure details depend on the amount, composition and geometry of the elongated particles used in the batch, the pore former in the batch and the firing cycle. Particularly good results were obtained with oxide-based batch raw materials (i.e. batches not containing clays or talcs). In known materials derived from particulate-only batches (i.e. no type 1 or type 2 elongated particles in the batch) large microstructure differences have been reported between oxide, clay/talc, talc-based and clay-based cordierite batches. Without being bound by theory, we believe that difference between materials made from particulate-only batches and materials made from the elongated particle-containing batches of the present disclosure are related to differences in the reaction sequence, such as formation of spinel or mullite as intermediate product or the amount of intermediate glass phase and its role in the cordierite formation. Strong reaction-sequence-related microstructure drivers have not been identified for the elongated particle cordierite batches. In the case of the reticular cordierite disclosed herein, the microstructure formation seems to be dominated by the templating of the precursor elongated particles. We have found that for the embodiments, particularly those formed from oxide batches, very little, if anything but a trace of, glassy phase or glass is present in the fired porous material disclosed herein, i.e. the porous ceramic material, comprising a principal cordierite phase, contains less than 1 wt % glass phase, or less than 0.1 wt % glass phase, or no more than a detectable trace amount of glass.

Properties of the different reticular cordierite material samples and their particulate comparative samples references are summarized in Table 2. The values of d10, d50, d90 etc. are in units of micrometers, % porosity is dimensionless, where pore sizes and porosity are measured by mercury intrusion porosimetry. By way of example, the values of d10, d50, and d90 are the pore diameters at 10%, 50%, and 90% of the total pore size distribution on a volumetric basis. Specifically, d10 is the pore diameter at 90% cumulative mercury intrusion volume, d50 is the pore diameter at 50% cumulative mercury intrusion volume, and, d90 is the pore diameter at 10% cumulative mercury intrusion volume. Thus, 10% of the pores are smaller than d10, 50% of the pores are smaller than d50, and 90% of the pores are smaller than d90, on a volumetric basis.

TABLE 2

| | Sample No. 1 | 2 | 3 | 4 | 5 | 6 | 7 | 8 |
|---|---|---|---|---|---|---|---|---|
| Batch No. | D1 | D2 | D12 | D3 | D4 | D5 | D6 | D7 |
| Firing temperature (° C.) | 1425 | 1430 | 1415 | 1415 | 1415 | 1415 | 1415 | 1410 |
| Hold time (hours) | 15 | 15 | 15 | 15 | 15 | 15 | 15 | 15 |
| % Porosity | 51.26 | 50.78 | 53.35 | 56.64 | 55.71 | 45.93 | 55.64 | 57.32 |
| d1 (μm) | 4.12 | 11.05 | 4.84 | 1.84 | 0.57 | 13.60 | 2.14 | 1.29 |
| d2 (μm) | 7.16 | 17.90 | 5.56 | 3.80 | 1.54 | 14.96 | 3.64 | 1.62 |
| d5 (μm) | 9.76 | 22.14 | 7.19 | 7.05 | 7.30 | 17.23 | 5.98 | 2.22 |
| d10 (μm) | 12.06 | 24.71 | 8.76 | 9.85 | 12.65 | 19.60 | 8.11 | 2.98 |
| d25 (μm) | 15.38 | 29.26 | 12.16 | 13.91 | 19.80 | 23.73 | 10.55 | 4.99 |
| d50 (μm) | 18.92 | 35.46 | 17.33 | 18.13 | 26.32 | 28.40 | 12.53 | 6.81 |
| d75 (μm) | 22.76 | 44.69 | 24.62 | 23.41 | 34.29 | 36.78 | 15.91 | 7.90 |
| d90 (μm) | 28.73 | 66.28 | 40.89 | 38.61 | 52.28 | 68.71 | 30.27 | 9.78 |
| d95 (μm) | 42.90 | 95.39 | 65.13 | 64.33 | 81.70 | 111.92 | 54.44 | 14.49 |
| d98 (μm) | 108.95 | 155.17 | 124.15 | 138.26 | 146.83 | 184.29 | 129.51 | 62.22 |
| d99 (μm) | 175.33 | 202.37 | 188.83 | 205.28 | 195.72 | 237.53 | 194.15 | 140.79 |
| (d50 − d10)/d50 | 0.36 | 0.30 | 0.49 | 0.46 | 0.52 | 0.31 | 0.35 | 0.56 |
| (d90 − d10)/d50 | 0.88 | 1.17 | 1.85 | 1.59 | 1.51 | 1.73 | 1.77 | 1.00 |
| Permeability (mdarcy) | 802 | 2725 | 592 | 769 | 699 | 1636 | 410 | 122 |
| CTE, 25-800° C. ($10^{-7}$/K) | 12.9 | 11.3 | 6.1 | 4.4 | 9.4 | 4.2 | 6.5 | 11.9 |
| CTE, 25-1000° C. ($10^{-7}$/K) | 14.3 | 12.8 | 8.1 | 6.2 | 11.2 | 6 | 8.4 | 13.8 |
| CTE, 500-300° C. ($10^{-7}$/K) | 4.3 | 4.4 | 4.5 | −4.4 | 4.4 | 5 | 4.5 | 5.7 |
| Cell Density (cells per square inch) | 200 | 200 | 200 | 200 | 200 | 200 | 200 | 200 |
| Wall Thickness ($10^{-3}$ inches) | 16 | 16 | 16 | 16 | 16 | 16 | 16 | 16 |
| rel. CFA | 0.401 | 0.401 | 0.401 | 0.401 | 0.401 | 0.401 | 0.401 | 0.401 |
| MOR (psi) | 294 | 676 | 385 | 268 | 520 | 489 | 481 | 724 |
| MOR (MPa) | 2.03 | 4.66 | 2.65 | 1.85 | 3.59 | 3.37 | 3.32 | 4.99 |
| MOR/rel CFA (psi) | 733 | 1686 | 960 | 668 | 1297 | 1219 | 1200 | 1805 |
| MOR/[CFA × [100 − porosity/100]] (MPa) | 10.38 | 23.59 | 14.16 | 10.63 | 20.20 | 15.53 | 18.65 | 29.13 |
| MOR/[CFA × [100 − porosity/100]] (psi) | 1504 | 3425 | 2058 | 1541 | 2928 | 2256 | 2704 | 4230 |

| | Sample No. 9 | 10 | 11 | 12 | 13 | 14 | 15 |
|---|---|---|---|---|---|---|---|
| Batch No. | D8 | D9 | D10 | D8 | D9 | D10 | D11 |
| Firing temperature (° C.) | 1425 | 1425 | 1425 | 1430 | 1430 | 1430 | 1410 |
| Hold time (hours) | 15 | 15 | 15 | 25 | 25 | 25 | 15 |
| % Porosity | 51.60 | 53.83 | 53.35 | 49.67 | 54.52 | 44.90 | 50.49 |
| d1 (μm) | 6.48 | 8.57 | 5.32 | 5.76 | 6.48 | 3.20 | 4.13 |
| d2 (μm) | 7.36 | 9.51 | 6.62 | 6.67 | 7.79 | 3.92 | 6.20 |
| d5 (μm) | 8.94 | 11.02 | 8.52 | 8.36 | 9.99 | 5.42 | 9.19 |
| d10 (μm) | 10.30 | 12.32 | 11.41 | 9.84 | 11.61 | 8.11 | 11.82 |
| d25 (μm) | 12.37 | 14.22 | 19.00 | 12.01 | 13.79 | 17.11 | 16.67 |
| d50 (μm) | 14.56 | 16.13 | 23.64 | 14.28 | 15.70 | 21.86 | 22.06 |
| d75 (μm) | 17.98 | 18.67 | 28.75 | 17.70 | 17.85 | 27.15 | 28.41 |
| d90 (μm) | 32.93 | 25.09 | 50.20 | 33.16 | 23.78 | 59.48 | 41.29 |
| d95 (μm) | 69.95 | 43.55 | 103.16 | 68.87 | 42.26 | 122.74 | 73.49 |
| d98 (μm) | 135.41 | 113.64 | 185.89 | 135.67 | 118.38 | 210.46 | 151.35 |
| d99 (μm) | 186.79 | 168.20 | 251.02 | 184.02 | 171.47 | 264.48 | 204.42 |
| (d50 − d10)/d50 | 0.29 | 0.24 | 0.52 | 0.31 | 0.26 | 0.63 | 0.46 |
| (d90 − d10)/d50 | 1.55 | 0.79 | 1.64 | 1.63 | 0.77 | 2.35 | 1.34 |
| Permeability (mdarcy) | 510 | 719 | 1358 | 466 | 708 | 1006 | 1003 |
| CTE, 25-800° C. ($10^{-7}$/K) | 7.7 | 9.9 | 8.6 | 8.2 | 9 | 6.1 | 4.3 |

TABLE 2-continued

| | | | | | | | |
|---|---|---|---|---|---|---|---|
| CTE, 25-1000° C. ($10^{-7}$/K) | 9.4 | 11.7 | 10.2 | 10.1 | 10.8 | 7.9 | 6 |
| CTE, 500-300° C. ($10^{-7}$/K) | 4.3 | 4.3 | 4.5 | 4.3 | 4.4 | 4.3 | 4.3 |
| Cell Density (cells per square inch) | 200 | 200 | 200 | 200 | 200 | 200 | 200 |
| Wall Thickness ($10^{-3}$ inches) | 16 | 16 | 16 | 16 | 16 | 16 | 16 |
| rel. CFA | 0.401 | 0.401 | 0.401 | 0.401 | 0.401 | 0.401 | 0.401 |
| MOR (psi) | 818 | 728 | 693 | 893 | 937 | 848 | |
| MOR (MPa) | 5.64 | 5.02 | 4.78 | 6.16 | 6.46 | 5.85 | |
| MOR/rel CFA (psi) | 2040 | 1815 | 1728 | 2227 | 2337 | 2115 | |
| MOR/[CFA × [100 − porosity/100]] (MPa) | 29.04 | 27.09 | 25.53 | 30.50 | 35.39 | 26.45 | |
| MOR/[CFA × [100 − porosity/100]] (psi) | 4215 | 3932 | 3704 | 4425 | 5137 | 3838 | |

In the oxide batches with type 1 elongated particles (Batch Comps. D2 and D10: Sample Nos. 2, 11, 14), cordierite grew into a fine microstructure of inter-twined strands that are comprised of individual small cordierite crystals with a terminating facet at the outside of the strand, see SEM A, B, and C of Sample 14 in FIG. 5. Strands have a diameter of 10-20 micrometers, are strongly interlinked and show extensive branching. On the fired wall surface, the size of individual crystals ranges from 2 to 5 micrometers. FIG. 5 shows SEM views of a fired wall surface of Sample 14 (Batch comp. D10, oxide batch with 36 wt % type 1 elongated particles) after firing to 1430° C.

Orientation mapping on polished cross- and long sections of Sample 14 showed a strong preferential alignment of the grown cordierite with its negative expansion direction in the extrusion direction.

A median "grain" size of about 9 μm was determined for a misorientation of 1.5 degrees; individual crystallites seemed to be smaller, 2-5 micrometers. The individual grains had equiaxial shape; they were not elongated in the direction of the strand.

Coarser microstructure can be obtained with larger pore size and also with larger domain size if potato starch is used as pore former instead of corn starch.

For low elongated particles in the batch levels, for example 10 wt % type 1 elongated particles (Batch Compositions D2) the microstructure has more similarity with that of a cordierite from a particulate-only batch, but still shows characteristics of reticular cordierite. For Sample 2, the typical domain dimensions are approximately 50 μm and the domains are less elongated. The preferential alignment in extrusion direction is lower due to the low elongated particle content and the coarser pore former. Both allow larger deviations of the elongated particle maximum axis from the extrusion direction and more misalignment of the negative expansion c-axis of cordierite around the preferential extrusion direction.

Based on a distinction criterion of 15 degree misorientation between different domains, an average domain dimension of 23 μm in diameter and 35 μm in length was found for Batch Comp. D10 (for Samples 11 and 14). Domains are elongated in the extrusion direction. For embodiments using type 2 elongated particles in the batch (Batch Comps. D8 and D9: Sample Nos. 9, 12, 10, 13), the reaction sequence is altered and mullite forms as intermediate reaction product. In this type of reaction sequence, typically the cordierite growth is controlled by the distribution of intermediate glass and is rather isotropic. As shown in FIG. 6 for an as-fired wall surface of Sample 13, an oxide batch with 50 wt % type 2 elongated particles after firing at 1430 C, the aluminosilicate elongated particles produce a reticular microstructure similar to that of the reticular microstructure formed from type 1 elongated particles. Again the pore structure is anisotropic with pores being elongated in the extrusion direction. Compared to the D10 batch, the fired surfaces are smoother and the material has less specific surface area.

Orientation mapping revealed a preferential alignment with the use of aluminosilicate elongated materials, but less than with alumina-rich elongated particles On long sections, the preferential alignment factor was 2.5; on the cross section, the determined factor was slightly smaller: 1.8.

A median grain size of 10 μm was determined using a 1.5 degree misorientation criterion for grain separation.

The domains had an ellipsoidal shape, with an average domain length of 40 μm along the strand and a diameter of 25 μm. The domains were determined using a 15° misorientation criterion.

Figure 7:
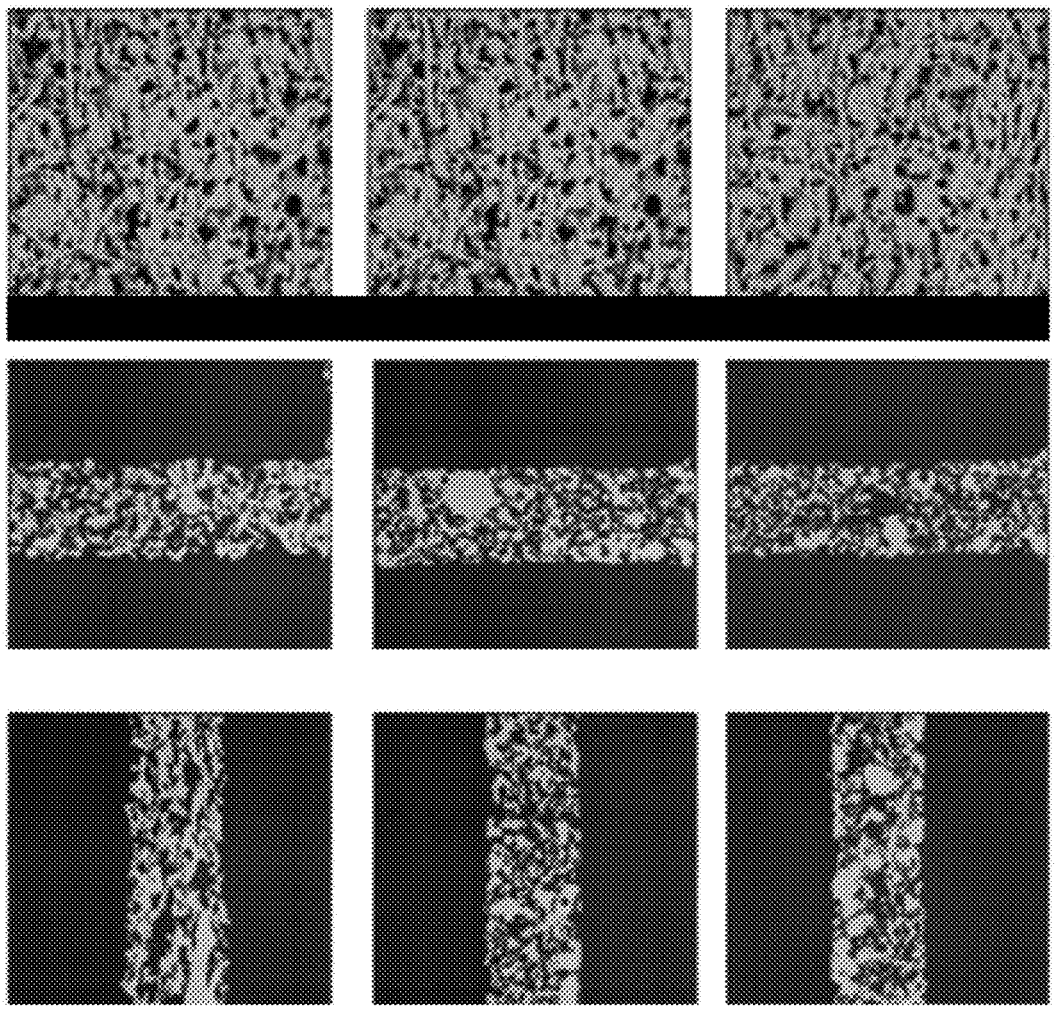
FIG. 7 shows as-fired views of a wall surface, polished cross sections and polished long sections of reticular cordierite made from oxide batches with elongated particles made from 36% elongated particles of type 1 (Batch No. D10) (left), 50% elongated particles of type 2 (Batch No. D9) (middle) and 70% elongated particles of type 2 (Batch No. D8) (right).

FIG. 7 shows as-fired views of a wall surface, polished cross sections and polished long sections of reticular cordierite made from oxide batches with 36 wt % type 1 elongated particles (Batch No. D10) (left), 50% type 2 aluminosilicate elongated particles (Batch No. D9) (middle) and 70% type 2 elongated particles (Batch No. D8) (right).

Figure 8:
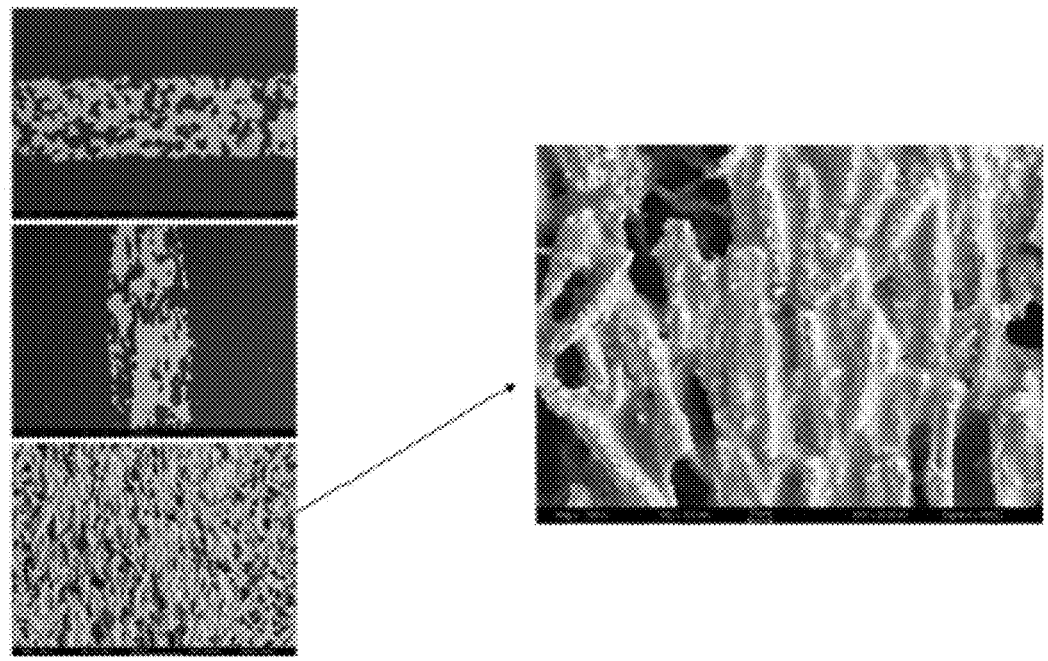
FIG. 8 shows a SEM micrograph for Sample 6 obtained from talc based Batch No. D5.
Figure 9:
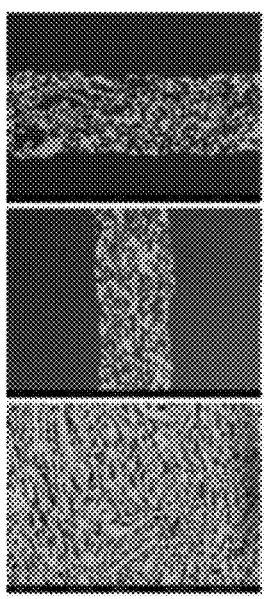
FIGS. 9 and 10 show SEM micrographs of as-fired wall surfaces and polished cross-section of reticular cordierite materials that were made from non-oxide batches (talc based Batch No. D6/Sample 7, and clay based Batch No. D7/Sample 8, respectively).
Figure 10:
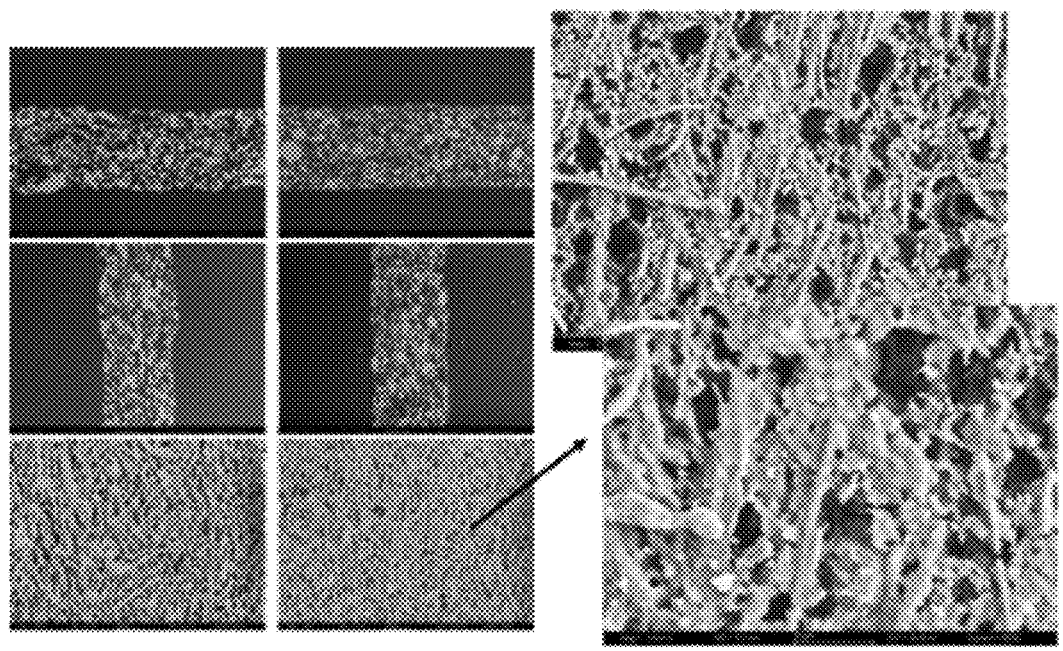

Reticular cordierite materials made from talc or clay along with elongated particles made from alumina or aluminosilicate, have a coarser microstructure, as seen in the SEM micrographs for Sample 6 in FIG. 8 obtained from talc based Batch No. D5. However, phases and phase fractions in reticular cordierite materials are unchanged compared to the corresponding particulate-only reference materials. X-ray diffraction and local chemical analysis do not reveal any significant differences. FIGS. 9 and 10 show SEMS of as-fired wall surfaces and polished cross-section of reticular cordierite materials that were made from non-oxide batches (talc based Batch No. D6/Sample 7, and clay based Batch No. D7/Sample 8, respectively).

As seen from the examples in Table 2, reticular cordierite according to the present disclosure exhibits higher material strength than comparative particulate-only derived cordierite for substantially the same porosity and median pore size. We found that the strength of the reticular cordierite as disclosed herein can be double or triple that of comparative cordierite materials. For example, a substantial tripling in strength was observed for oxide batches with aluminosilicate elongated particles to have similar porosity and similar median pore size (e.g. compare Samples 9 and 10 to Sample D1).

In oxide batches with type 1 elongated particles, a significant increase of median pore size at similar porosity was obtained, and, despite the increase in $d_{50}$, the strength was significantly increased (e.g. compare Samples 2 and 11 to Sample 1). That is, an increase in strength was observed despite that strength typically significantly decreases with increasing d50 in known cordierite compositions.

Clay, talc and Clay-talc cordierite batches with elongated particles showed a significant increase in strength despite an increase of the median pore size at similar porosity (e.g. compare Sample 5 to Sample 4). The strength was substantially increased, even though strength is expected to decrease with increasing d50 for known cordierite compositions.

We have found that the cordierite batches disclosed herein utilizing elongated particles not only increase the fully fired strength of the porous ceramic material, but the disclosed reticular cordierite shows significant improvement in green and intermediate firing strength over a wide range of firing temperatures from green to fully fired ware.

Figure 11:
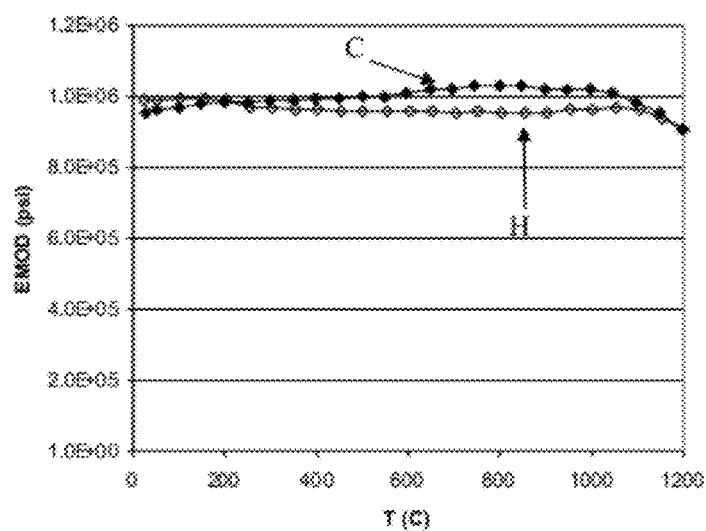
FIG. 11 shows Axial Young's modulus ("elastic modulus") in units of psi plotted as a function of temperature (° C.) that resulted during heating ("H") and cooling ("C") cycle of Sample 12 formed from oxide batch No. D8 with elongated particles made from 47% aluminosilicate elongated particles fired at 1430° C.

The elastic modulus of reticular cordierite obtained from an oxide batch with type 2 elongated particles shows very little hysteresis as compared to known cordierite compositions. For example, FIG. 11 shows Axial Young's modulus ("elastic modulus") in units of psi plotted as a function of temperature (° C.) that resulted during heating and cooling cycle of Sample 12 formed from oxide batch No. D8 with 47 wt % type 2 elongated particles fired at 1430° C. The curves exhibits strong similarity with behavior typically obtained for non-microcracked cordierite.

Figure 12:
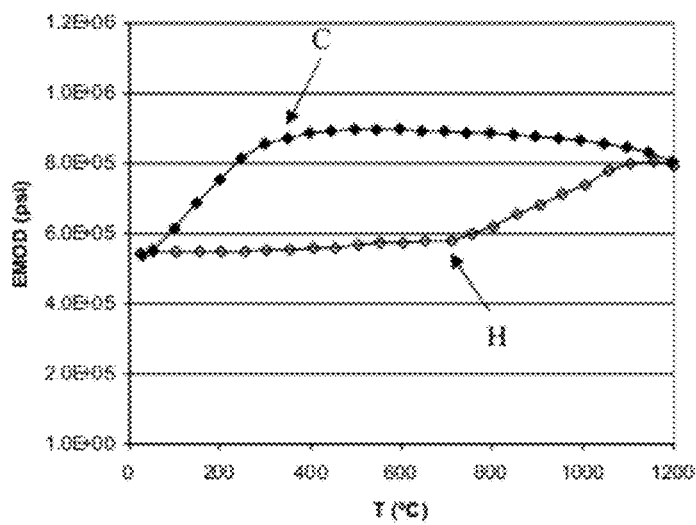
FIG. 12 shows the elastic modulus (in psi) of known microcracked cordierite ceramic, not formed from elongated particles in the batch, versus temperature (° C.) during heating ("H") and cooling ("C").

For comparison, the elastic modulus (in psi) of microcracked cordierite ceramic (Sample 3, Batch D12: not formed from elongated particles in the batch) is shown in FIG. 12 versus temperature (° C.) during heating (arrow facing right) and cooling (arrow facing left) which illustrates the hysteresis in elastic modulus during heating and cooling cycle of microcracked cordierite.

At the same porosity, the elastic modulus of a microcracked particulate cordierite ceramic is lower than a non-microcracked ceramic and also lower than that of the corresponding reticular cordierite disclosed herein, which indicates that the reticular cordierite has lower microcrack density than the typical known microcracked cordierite. We have found that the elastic modulus of the reticular cordierite disclosed herein is much lower than typical known microcracked cordierite, and in some embodiments the reticular cordierite has negligible microcrack density.

As seen in FIG. 12, the elastic modulus in a heating and a cooling cycle of a reference microcracked cordierite ceramic shows an extensive hysteresis which, without being bound by theory, we believe appears to be related to, during heating to temperatures above about 700° C., microcracks in the material start to close, which yields an increase in the elastic modulus during heating in the temperature range from about 700° C. to 1200° C. At around 1200° C., microcracks are typically closed in most cordierite materials, and a non-microcracked ceramic is at that temperature obtained. In the cooling cycle from 1200° C. to room temperature, the elastic modulus curve follows initially that of the non-microcracked ceramic, characterized by a straight line with a slightly negative slope, the slope of which is determined by the intrinsic elastic modulus of the cordierite ceramic with the contributions of the secondary phases. When a critical local stress is reached during cooling, microcracks start to form during further cooling. The onset of microcracking during cooling is observed in the elastic modulus cooling curve for temperatures below 500° C. The elastic modulus then decreases with decreasing temperature, reflecting increasing microcracking. At room temperature, the elastic modulus of the cooling curve finally reaches the original starting value of the heating curve, which is the room temperature elastic modulus of the microcracked ceramic $E_{MC}^{RT}$. An imaginary elastic modulus of the non-microcracked ceramic at room temperature, $E_{NMC}^{RT}$, can be derived from the straight portion of the cooling curve in the temperature range from 600° C. to 1000° C. by extrapolating the straight line to room temperature, $E_{NMC}^{RT} = E^{1000C} - 975 \cdot (E^{1000C} - E^{600C})/400$. The degree of hysteresis between the heating and cooling elastic modulus curves reflects the microcrack density of the material at room temperature. The microcrack density is proportional to the ratio of the elastic modulus of the microcracked material $E_{mc}^{RT}$ and the (virtual) modulus of the corresponding non-microcracked material $E_{nmc}^{RT}$. A parameter MCD, defined as $MCD = (9/16)[(E_{nmc}^{RT}/E_{mc}^{RT})-1]$ is used as measure for the microcrack network density. MCD=0 for non-microcracked ceramics, MCD is small for cordierite with low microcrack density (typically MCD<0.2) and MCD>0.5 for strongly microcracked cordierite.

We have found that MCD for the reticular cordierite (for example the oxide batch with type 2 elongated particles in FIG. 11) is very small, close to one, which indicates the very low level of microcracks in the material. In some samples, the reticular cordierite oxide batches show almost no microcracking. In some embodiments, the cordierite phase of the porous ceramic article disclosed herein has a microcrack density (MCD) less than 0.15, and even less than 0.10. In some embodiments, the porous ceramic article disclosed herein is non-microcracked at room temperature (20° C.)

Implementation of various pore formers and amounts in the batch can provide various desired porosities, in addition to improved strength, with the reticular cordierite disclosed herein, e.g. the pore size distributions can be narrowed to achieve low d-factors, e.g. (d50−d10)/d50<0.3.

Figure 13:
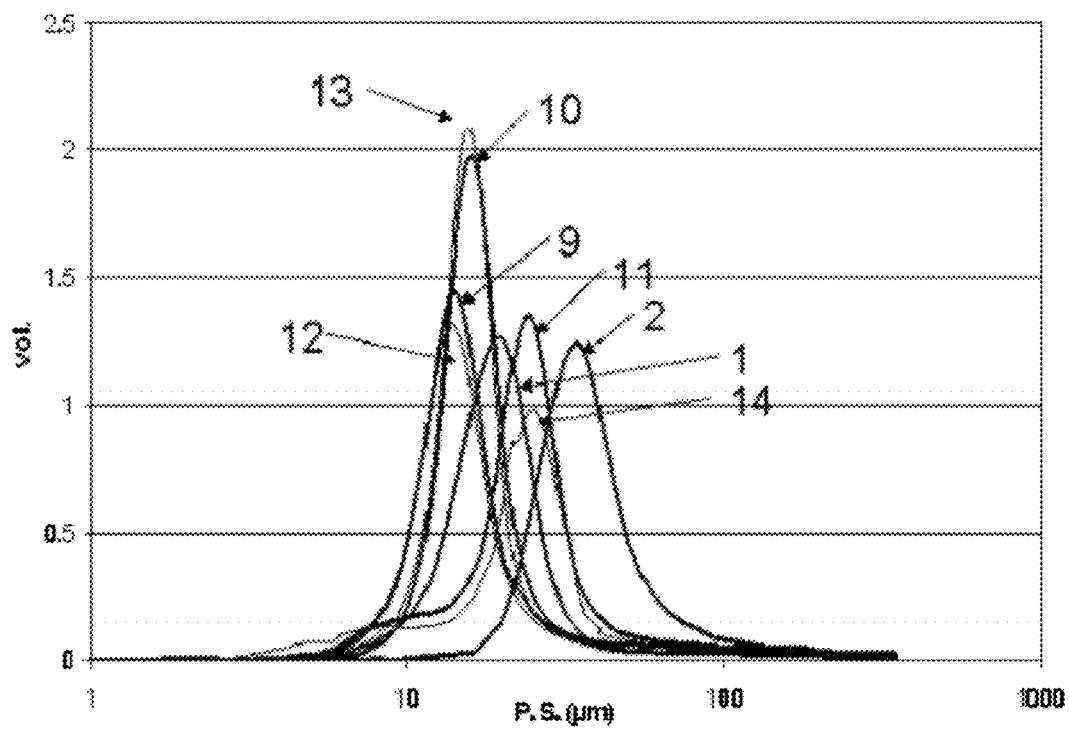
FIG. 13 shows the pore size distributions of various embodiments of oxide batches with elongated particles made from alumina-rich and aluminosilicate elongated particles with small particle size pore former (corn starch (CS)) and large particle size pore former (potato starch (PS)) in the batch.
Figure 14:
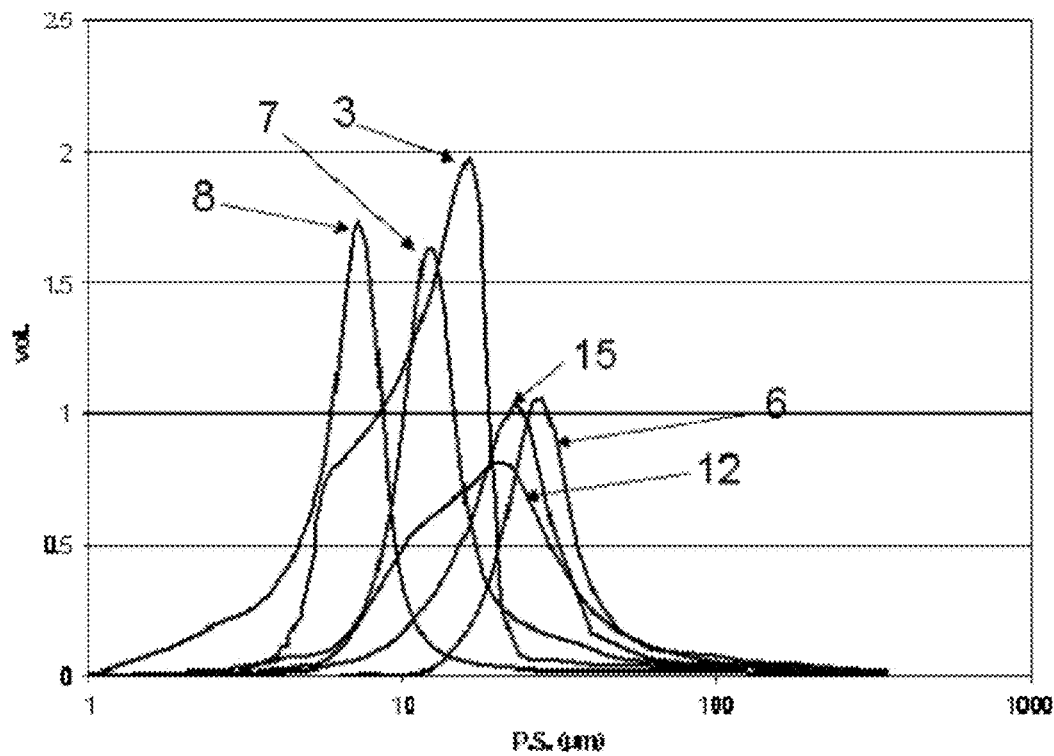
FIG. 14 shows pore size distributions of various embodiments of reticular cordierite made from clay-talc, talc or clay batches with elongated particles made from both types of elongated particles, and coarse (PS) or fine (CS) pore former.

Pore size distributions of several reticular microstructures are illustrated in FIGS. 13-14 which plots the differential intrusion volume from mercury intrusion porosimetry vs. the pore size in μm. Pore size distributions of comparative cordierite are also shown. FIG. 13 shows the pore size distributions of various embodiments of oxide batches with elongated particles made from both types 1 and 2 elongated particles with small particle size pore former (corn starch (CS)) and large particle size pore former (potato starch (PS)) in the batch.

FIG. 13 shows pore size distributions of various embodiments of reticular cordierite made from clay-talc, talc or clay batches with both types of elongated particles, and coarse (PS) or fine (CS) pore former. Particulate reference materials are also presented for comparison.

As seen from Table 2 and FIGS. 13-14, a porous ceramic can be obtained according to the present disclosure having high D50, and moreover high D50 and high strength. In some of these embodiments, the porosity can be quite high. In some embodiments, D50 is greater than 10 μm, and in some of these embodiments greater than greater than 20 μm, and in some of these embodiments greater than greater than 30 μm, and in some of these embodiments greater than 50 μm. In some embodiments, D50 is greater than 25 μm and normalized strength greater than 15 MPa. In some embodiments, D50 is greater than 25 μm and normalized strength greater than 20 MPa. In some embodiments, D50 is greater than 25 μm and porosity greater than 45%, or greater than 50%, or even greater than 55%. In some embodiments, D50 is greater than 25 μm, and normalized strength greater than 15 MPa, and porosity greater than 45%, or greater than 50%, or even greater than 55%. In some embodiments, D50 is greater than 25 µm and normalized strength is greater than 20 MPa and porosity is greater than 45%, and even greater than 50%.

Also seen from Table 2 and FIGS. 13-14, a porous ceramic can be obtained according to the present disclosure having low D50, and moreover low D50 and high strength. In some of these embodiments, the porosity can be quite high. In some embodiments, D50 is less than 15 µm and normalized strength is greater than 15 MPa. In some embodiments, D50 is less than 15 µm and normalized strength is greater than 20 MPa. In some embodiments, D50 is less than 15 µm and normalized strength is greater than 15 MPa and porosity is greater than 50%, and in some of these embodiments even greater than 55%. In some embodiments, D50 is less than 15 µm and normalized strength is greater than 20 MPa and porosity is greater than 50%, and in some of these embodiments even greater than 55%.

The cordierite materials with reticular microstructure disclosed herein have low thermal expansion, i.e. less than $15 \times 10^{-7} K^{-1}$, and in some embodiments less than $10 \times 10^{-7} K^{-1}$. Improved thermal shock resistance for applications as substrates and filters can be obtained from the combination of high strength and low thermal expansion. Additionally, the thermal expansion heating and cooling curves of various embodiments show slight hysteresis, indicating that the microcrack density in these materials is quite low.

Figure 15:
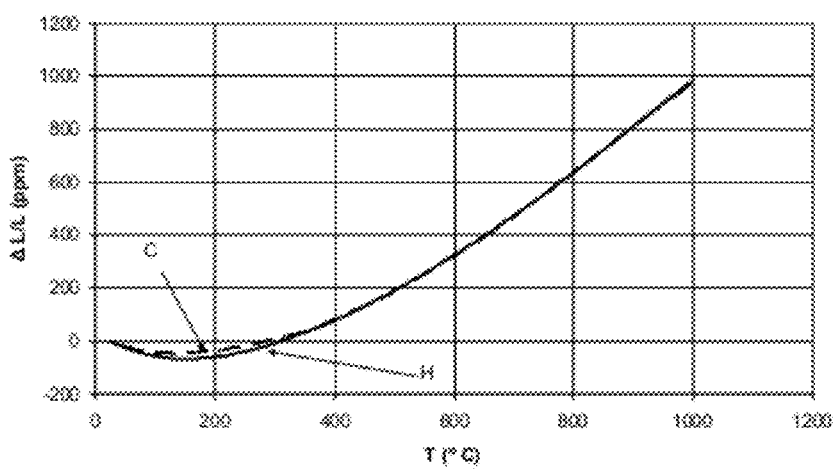
FIG. 15 shows a thermal expansion heating ("H") and cooling ("C") curve (Delta L/L in ppm vs. temperature in ° C.) for a representative example of an oxide batch with aluminosilicate elongated particles.

FIG. 15 shows a thermal expansion heating and cooling curve (Delta L/L in ppm vs. temperature in ° C.) for a representative example of an oxide batch with type 2 elongated particles according to the present disclosure wherein hysteresis is negligible.

Figure 16:
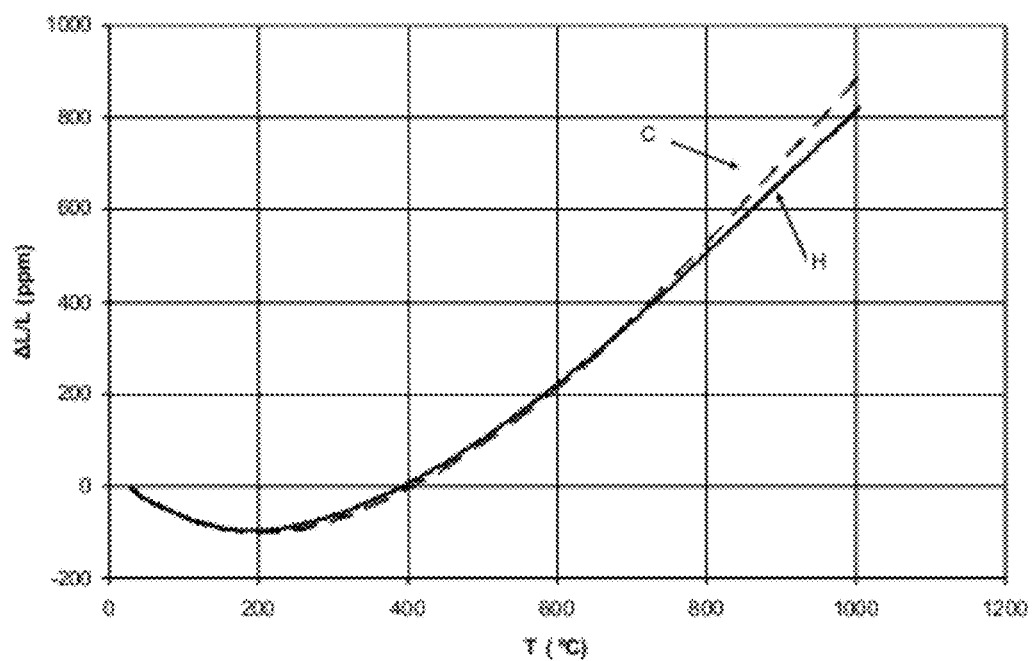
FIG. 16 shows a thermal expansion heating ("H") and cooling ("C") curve (Delta L/L in ppm vs. temperature in ° C.) for Sample 7 made from a talc-based batch with elongated particles made from 45% aluminosilicate elongated particles.

FIG. 16 shows a thermal expansion heating and cooling curve (Delta L/L in ppm vs. temperature in ° C.) for Sample 7 made from a talc-based batch with 45 wt % type 2 elongated particles, wherein hysteresis is negligible.

We have found that using type 1 or type 2 elongated particles in the cordierite batch produces a reticular microstructure generally with small cordierite grains being bundled in larger strands into a reticular network. In the reticular structure, the cordierite material exhibits a preferential crystallographic orientation with its c-axis in the extrusion direction (alignment direction of the precursor elongated particles during extrusion). Without being bound by theory, we believe that the packing behavior of the elongated particles in the greenware limit the growth of cordierite grain size and domain size, so that the resulting material has a lower microcrack density than a comparative cordierite material not made from elongated particles. That is, alignment and small domain size yield a low, even negligible microcrack density in the reticular cordierite that is associated with an increase in material strength. The elongated particles made from fibrous materials have higher surface area than particulate materials at same porosity and also show lower microcrack density. Reticular cordierite may provide a greater ability to withstand higher mechanical solicitation such as thermal shock, vibration or impact as compared to known cordierite microstructures and thus may be used in high thermal shock resistance and/or high durability (strength) applications.

In one aspect, a porous ceramic material is disclosed herein comprised of a principal cordierite phase, the porous ceramic material exhibiting a normalized strength, $(MOR)(relCFA)^{-1}(1-porosity/100)^{-1}$, greater than 15 MPa, wherein MOR is a value in units of MPa obtained from a four point flexure modulus of rupture test according to ASTM C1674-08 of a honeycomb sample having a cell density (CD) in units of cells per square units of a length measure and honeycomb matrix cell wall thickness ($T_{WALL}$) in units of the length measure, wherein relCFA is the relative closed frontal area defined herein as: $relCFA=T_{WALL}[2 L-T_{WALL}]/L^2$, wherein $L=CD^{-1/2}$, and wherein porosity is the total porosity, in %, as measured by mercury intrusion porosimetry.

In some embodiments, the porous ceramic material has less than 1 wt % glass phase, and in some embodiments less than 0.1 wt % glass phase, and in some embodiments even less than 0.01 wt % glass phase.

In some embodiments, the porous ceramic material exhibits a normalized strength of greater than 20 MPa, and in some embodiments greater than 25 MPa, and in some embodiments even greater than 30 MPa.

In some embodiments, the porous ceramic material has a total porosity of greater than or equal to 45%, and in some embodiments greater than or equal to 50%, and in some embodiments greater than or equal to 55%, and in some embodiments 45 to 60%.

In some embodiments, the porous ceramic material has a d50 greater than 5.0 µm, in some embodiments greater than 10.0 µm, in some embodiments greater than 15.0 µm, in some embodiments greater than 20.0 µm, in some embodiments greater than 25.0 µm, and in some embodiments greater than 30.0 µm.

In some embodiments, the porous ceramic material has a d-factor ("$d_F$")=(d50−d10)/d50 which is less than <1.00, in some embodiments less than <0.70, in some embodiments less than <0.60, in some embodiments less than <0.50, in some embodiments less than <0.40, in some embodiments less than <0.30, and, in some embodiments less than <0.25.

In some embodiments, the porous ceramic material exhibits a normalized strength of greater than 20 MPa, and has a total porosity of greater than or equal to 45%. In some embodiments, the porous ceramic material exhibits a normalized strength of greater than 25 MPa, and has a total porosity of greater than or equal to 50%. In some embodiments, the porous ceramic material exhibits a normalized strength of greater than 30 MPa, and has a total porosity of greater than or equal to 55%. In some embodiments, the porous ceramic material exhibits a normalized strength of greater than 25 MPa, and has a total porosity of greater than or equal to 45%. In some embodiments, the porous ceramic material exhibits a normalized strength of greater than 20 MPa, and has a total porosity of 50 to 60%. In some embodiments, the porous ceramic material exhibits a normalized strength of greater than 20 MPa, and has a total porosity of 45 to 55%. In some embodiments, the porous ceramic material exhibits a normalized strength of greater than 25 MPa, and has a total porosity of greater than or equal to 50%.

In some embodiments, the porous ceramic material exhibits a normalized strength of greater than or equal to 20 MPa, and a d50 of 5.0 to 25 µm. In some embodiments, the porous ceramic material exhibits a normalized strength of greater than or equal to 20 MPa, and a d50 of greater than 20 µm.

In some embodiments, the porous ceramic material has a coefficient of thermal expansion from 25 to 800° C., ($CTE_{25-800° C.}$), of less than $15 \times 10^{-1} K^{-1}$, and in some of these embodiments less than $10 \times 10^{-7} K^{-1}$.

In some embodiments, the porous ceramic material disclosed herein has an anisotropic microstructure.

In some embodiments, the cordierite phase has a median grain size smaller than 10 µm.

Preferably, the cordierite phase has a reticular microstructure, and further preferably the cordierite phase comprises domains having an ellipsoidal shape.

In some embodiments, the cordierite phase has an average domain size of less than 50 µm. In some embodiments, the cordierite phase has an average domain size of 30 to 50 µm.

In some embodiments, the cordierite phase has an average domain size of less than 30 µm. In some embodiments, the cordierite phase has an average length in a maximum dimension of 30 to 50 µm, a first transverse diameter of 20 to 30 µm in a second direction perpendicular to the maximum direction, and a second transverse diameter of 20 to 30 µm in a third direction perpendicular to the maximum and second directions.

In some embodiments, the cordierite phase has a microcrack density (MCD) less than 0.15, in some of these embodiments, the cordierite phase has a microcrack density (MCD) less than 0.10. In some embodiments, the cordierite phase is non-microcracked.

In another aspect, a method for forming a porous ceramic body having a predominant phase of cordierite is disclosed herein, the method comprising: forming a plasticized mixture comprising inorganic ceramic-forming ingredients comprised of a magnesia source, a silica source, and an alumina source, the alumina source comprising alumina-containing elongated particles, wherein at least 90 wt % of the alumina-containing elongated particles have a length of 50 to 150 µm, the alumina-containing elongated particles being selected from the group consisting of: (a) a first type of elongated particle containing at least 90 wt % alumina, and (b) a second type of elongated particle containing at least 40 wt % alumina and at least 40 wt % silica, wherein at least 75 wt % of the elongated particles of the first type have diameters of 1 to 15 µm, and wherein at least 75 wt % of the elongated particles of the second type have diameters of 1 to 15 µm; extruding the plasticized mixture into a green body; and heating the green body to form the porous ceramic body.

In some embodiments, the alumina-containing elongated particles constitute 10 to 70 wt % of the inorganic ceramic-forming ingredients. In some embodiments, the alumina-containing elongated particles constitute 25 to 70 wt % of the inorganic ceramic-forming ingredients.

In some embodiments, wherein the alumina-containing elongated particles are obtained by mulling fibrous raw material. In some embodiments, the alumina-containing elongated particles are not formed by a drawing process, i.e. they are undrawn elongated particles.

In some embodiments, the majority of the alumina-containing elongated particles have a length of 50 to 150 µm.

In some embodiments, at least 90 wt % of the elongated particles of the first type, if present, have diameters of 2 to 5 µm.

In some embodiments, the elongated particles of the first type, if present, contain less than 5 wt % silica.

In some embodiments, the elongated particles of the first type, if present, contain at least 50 wt %, and in other embodiments at least 60 wt %, alpha alumina.

In some embodiments, the elongated particles of the first type, if present, contain no more than about 10 wt % mullite. In some embodiments, the elongated particles of the first type, if present, contain no more than about 5 wt % mullite.

In some embodiments, the elongated particles of the first type, if present, contain no more than about 10 wt % cubic alumina.

In some embodiments, the elongated particles of the first type, if present, contain no more than about 6 wt % cubic alumina.

In some embodiments, at least 90 wt % of the elongated particles of the second type, if present, have diameters of 1 to 3 µm.

In some embodiments, the alumina-containing elongated particles constitute at least 30 wt % of the inorganic ceramic-forming ingredients.

In some embodiments, the alumina-containing elongated particles constitute at least 35 wt %, and in other embodiments at least 40 wt %, and in other embodiments at least 50 wt %, and in other embodiments at least 60 wt % of the inorganic ceramic-forming ingredients.

In some embodiments, the inorganic ceramic-forming ingredients comprise at least 30 wt %, and in other embodiments at least 35 wt %, and in other embodiments at least 40 wt %, and in other embodiments at least 50 wt %, and in other embodiments at least 60 wt % alumina or aluminosilicate elongated particles.

In some embodiments, the alumina source further comprises isotropically shaped alumina-containing particles. In some embodiments, the inorganic ceramic-forming ingredients comprise isotropically shaped alumina-containing particles and at least 30 wt % alumina-containing elongated particles, and in other embodiments at least 35 wt % alumina-containing elongated particles, and in other embodiments at least 40 wt % alumina-containing elongated particles.

In some embodiments, the method further comprises, before forming the plasticized mixture, obtaining the alumina-containing elongated particles by working alumina-containing fibrous raw material, the working consisting of one or more of the following: mulling, cutting, crushing, chopping, electrochemically reacting, anodic oxidation.

In some embodiments, the inorganic ceramic-forming ingredients are mixed together to form a dry batch, and then an aqueous-based solvent is mixed with the dry batch to form the plasticized batch. In some of these embodiments, the magnesia source and the silica source of the inorganic ceramic-forming ingredients are preferably mixed together prior to the alumina source being mixed in with the magnesia and silica sources.

In some embodiments, the inorganic ceramic-forming ingredients are mixed together and mulled together to form a dry batch, and then an aqueous-based solvent is mixed with the dry batch to form the plasticized batch.

In some embodiments, the heating of the green body comprises exposing the green body to an environment at a heating rate of greater than 100° C./hr, and in other embodiments greater than 120° C./hr.

In some embodiments, the heating of the green body comprises exposing the green body to an environment with a top temperature of 1410 to 1435° C.

In some embodiments, the heating of the green body comprises exposing the green body to an environment at a heating rate of greater than 100° C./hr and with a top temperature of 1410 to 1435° C. In some embodiments, the heating of the green body comprises exposing the green body to an environment at a heating rate of greater than 120° C./hr and with a top temperature of 1410 to 1435° C.

In some embodiments, the plasticized mixture contains no talc. In some embodiments, the plasticized mixture contains no clay. In some embodiments, the plasticized mixture contains no talc and no clay. In some embodiments, the inorganic ceramic-forming ingredients comprise a plurality of inorganic ingredients selected from the group consisting of: talc, kaolin clay, silica, and magnesia.

In some embodiments, the plasticized mixture further comprises at least one processing component selected from the group consisting of binders, lubricants, plasticizers, pore formers and solvents. In some of these embodiments, the plasticized mixture further comprises a pore former, and the pore former is one or more of the following: starch, graphite, polystyrene beads, wax. The pore former may be introduced into the batch in the form of spherical particles.

The invention claimed is:

1. A porous ceramic material comprised of a principal cordierite phase having a reticular microstructure, the porous ceramic material exhibiting a normalized strength, (MOR) $(relCFA)^-(1-porosity/100)^{-1}$, greater than 20 MPa, wherein MOR is a value in units of MPa obtained from a four point flexure modulus of rupture test according to ASTM C1674-08 of a honeycomb sample having a cell density (CD) in units of cells per square units of a length measure and honeycomb matrix cell wall thickness ($T_{WALL}$) in units of the length measure, wherein relCFA is the relative closed frontal area defined herein as: $relCFA=T_{WALL}[2L-T_{WALL}]/L^2$, wherein $L=CD^{-1/2}$, and wherein porosity is the total porosity, in %, as measured by mercury intrusion porosimetry; the porous ceramic material having less than 1 wt % glass phase and a total porosity of greater than or equal to 45%.

2. The porous ceramic material of claim 1 wherein the porous ceramic material has a total porosity of 45 to 60%.

3. The porous ceramic material of claim 1 wherein the porous ceramic material has a d50 greater than 5.0 µm.

4. The porous ceramic material of claim 1 wherein the porous ceramic material has a d50 greater than 15 µm.

5. The porous ceramic material of claim 1 wherein the porous ceramic material has a d50 less than 15 µm.

6. The porous ceramic material of claim 1 wherein the porous ceramic material exhibits a normalized strength of greater than 25 MPa.

7. The porous ceramic material of claim 1 wherein the porous ceramic material exhibits a normalized strength of greater than or equal to 20 MPa, and a d50 of 5.0 to 25 µm.

8. The porous ceramic material of claim 1 wherein the porous ceramic material has a coefficient of thermal expansion from 25 to 800° C., ($CTE_{25-800}$° C.), less than $15\times10^{-7}$ $K^{-1}$.

9. The porous ceramic material of claim 1 wherein the cordierite phase has a median grain size smaller than 10 µm.

10. The porous ceramic material of claim 1 wherein the cordierite phase has an average domain size of less than 50 µm.

11. The porous ceramic material of claim 1 wherein the cordierite phase has an average length in a maximum dimension of 30 to 50 µm, a first transverse diameter of 20 to 30 µm in a second direction perpendicular to the maximum direction, and a second transverse diameter of 20 to 30 µm in a third direction perpendicular to the maximum and second directions.

12. The porous ceramic material of claim 1 wherein the cordierite phase has a microcrack density (MCD) less than 0.15.

13. The porous ceramic material of claim 1 wherein the porous ceramic material has a coefficient of thermal expansion from 25 to 800° C., ($CTE_{25-800}$° C.), less than $10\times10^{-7}$ $K^{-1}$.

14. The porous ceramic article of claim 1 wherein the porous ceramic material exhibits a normalized strength of greater than 25 MPa, and has a total porosity of greater than or equal to 50%.

15. The porous ceramic article of claim 1, wherein the porous ceramic material has a total porosity of greater than or equal to 50%, and has a coefficient of thermal expansion from 25 to 800° C., ($CTE_{25-800}$° C.), less than $10\times10^{-7}$ $K^{-1}$.

* * * * *